ANALOG POSITION TO BINARY NUMBER TRANSLATOR

Filed June 29, 1965 6 Sheets-Sheet 1

INVENTOR.
MORTON H. LEWIN
BY
[signature]
Attorney

Sept. 9, 1969 M. H. LEWIN 3,466,646

ANALOG POSITION TO BINARY NUMBER TRANSLATOR

Filed June 29, 1965 6 Sheets-Sheet 2

INVENTOR.
MORTON H. LEWIN
BY
[signature]
Attorney

ANALOG POSITION TO BINARY NUMBER TRANSLATOR

Filed June 29, 1965

LEGEND: "1" SECTION
"0" SECTION

INVENTOR.
MORTON H. LEWIN
BY
Samuel Cohen
Attorney

ANALOG POSITION TO BINARY NUMBER TRANSLATOR
Filed June 29, 1965 6 Sheets-Sheet 4
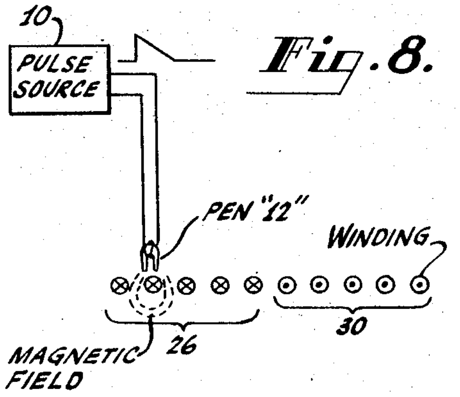
Fig. 8.
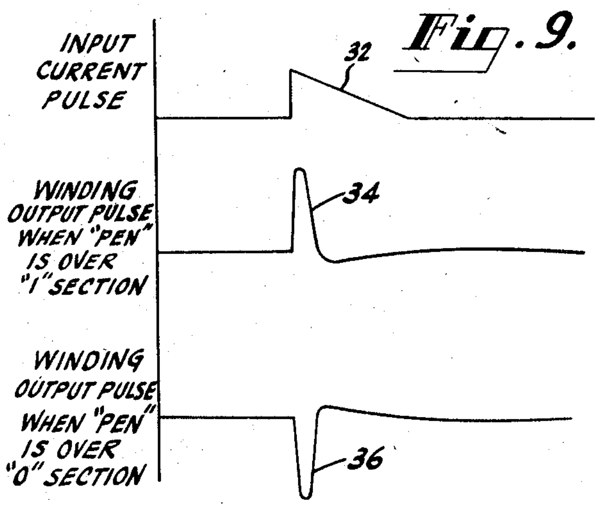
Fig. 9.
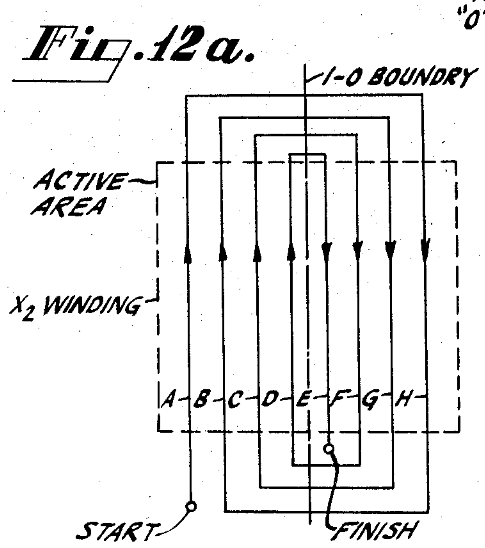
Fig. 12a.
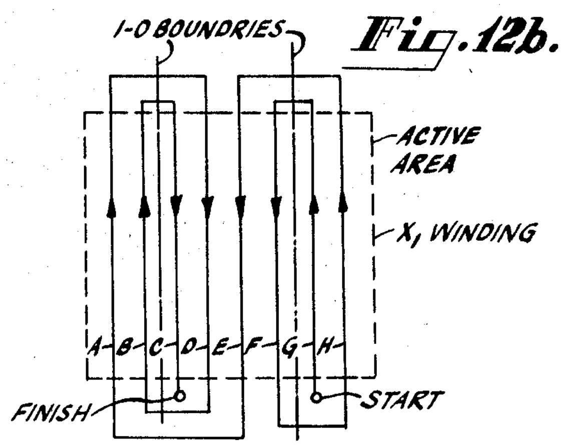
Fig. 12b.
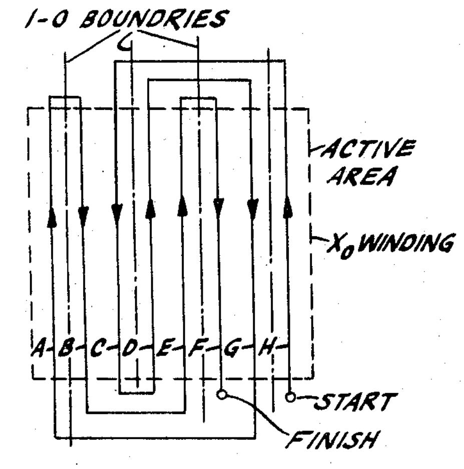
Fig. 12c.
| WIRE | CODE $X_2$ | $X_1$ | $X_0$ |
|---|---|---|---|
| A | 1 | 1 | 1 |
| B | 1 | 1 | 0 |
| C | 1 | 0 | 0 |
| D | 1 | 0 | 1 |
| E | 0 | 0 | 1 |
| F | 0 | 0 | 0 |
| G | 0 | 1 | 0 |
| H | 0 | 1 | 1 |
Fig. 12d.
INVENTOR.
MORTON H LEWIN
BY [signature]
Attorney INVENTOR.
MORTON H. LEWIN
BY [signature]
Attorney INVENTOR.
MORTON H. LEWIN
BY [signature]
Attorney United States Patent Office 3,466,646

Patented Sept. 9, 1969

3,466,646

ANALOG POSITION TO BINARY NUMBER TRANSLATOR

Morton H. Lewin, Trenton, N.J., assignor to RCA Corporation, a corporation of Delaware Filed June 29, 1965, Ser. No. 468,076

Int. Cl. H04l 3/00

U.S. Cl. 340—347 11 Claims

ABSTRACT OF THE DISCLOSURE

A "pen" produces a magnetic field and applies it to a restricted region of a "tablet." The latter, which includes successive layers of windings, is a signal receiver. One group of windings produces outputs in binary form indicative of the pen position in one coordinate, such as the X coordinate, and another group of windings produces outputs in binary form indicative of the pen position in another coordinate, such as the Y coordinate. Each winding of a group is coded to represent a different order bit in a binary system of notation.

This invention relates to a system for translating analog information, such as graphical information, into digital form.

One class of devices for translating analog positional information into binary data includes the light "pen described in B. M. Gurley et al., "Light-Pen Links Computer to Opertor," Electrics, Nov. 20, 1959, pages 85–87, and the "tablet" described in M. R. Davis et al., "The Rand Tablet: A Man-Machine Graphical Communication Device," Proc. 1964 Fall Joint Computer Conference. In both of these devices, the user traces over a flat "writing" surface with a "pen" and the pen's position periodically is sensed and translated into binary information. The flat surface may have recorded thereon a map, curve, character or the like, and the tracing by the pen of this recorded analog data produces binary data suitable for use in a digital computer.

The light pen discussed in the first article above employs the screen of a cathode ray tube as the "writing" surface. A light sensitive element at the tip of the pen generates a signal when it detects the flying spot produced by the moving electron beam. The time of receipt of this signal relative to the timing of the scanning of the electron beam establishes the pen position. Rather complex digital and analog peripheral circuits are employed to convert the signal picked up by the pen to the binary information which is stored.

Aside from the system complexity, the light pen arrangement has a number of limitations. One is that the speed at which the pen may be moved is limited by the frame rate of the scanned electron beam. Another is that relatively opaque material, such as a sheet of paper or the like, cannot be inserted between the cathode ray tube screen and the pen as it would prevent, or at least severely impede, the transmission of light.

The tablet described in the second article consists of a Mylar sheet formed with an array of etched copper lines extending in the X direction on one surface thereof and a similar array of lines extending in the Y direction of the opposite surface thereof. Different voltage pulse trains are applied to the respective X and Y lines by capacitor encoding networks. The pen, which is a metallic electrostatic pick-up connected to a high input impedance amplifier, picks up a particular pulse train from the X and Y lines nearest to its tip. This pulse train is converted to a binary code by logic circuits which include a shift register and code converter.

The tablet described above overcomes some of the disadvantageous operating characteristics of the first system. However, rather complex and expensive circuits are needed for the generation of the pulse trains and for their detection and conversion to appropriate binary values.

In both of the systems described, the writing surface is the signal generator and the pen is the signal receiver. In the system of the present invention, exactly the reverse relationship exists. The pen, which is simply a means for producing a localized magnetic field, is the signal transmitter. The tablet, which includes successive layers of windings, is the signal receiver. One group of these windings produces outputs in binary form indicative of the pen position in one coordinate, such as the X coordinate, and the other group of windings produces outputs in binary form indicative of the pen position along another coordinate, such as the Y coordinate. Each winding of a group is coded (wound) to represent a different order bit in a binary system of notation.

The invention is discussed in greater detail below and is shown in the following drawings, of which:

Figure 1:
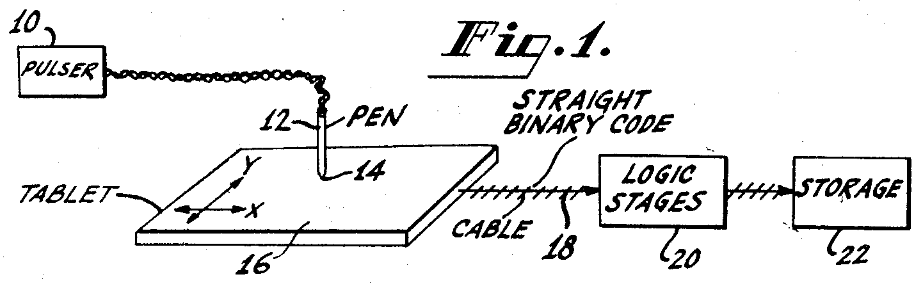
FIGURE 1 is a schematic showing of one form of the present invention.
Figure 10:
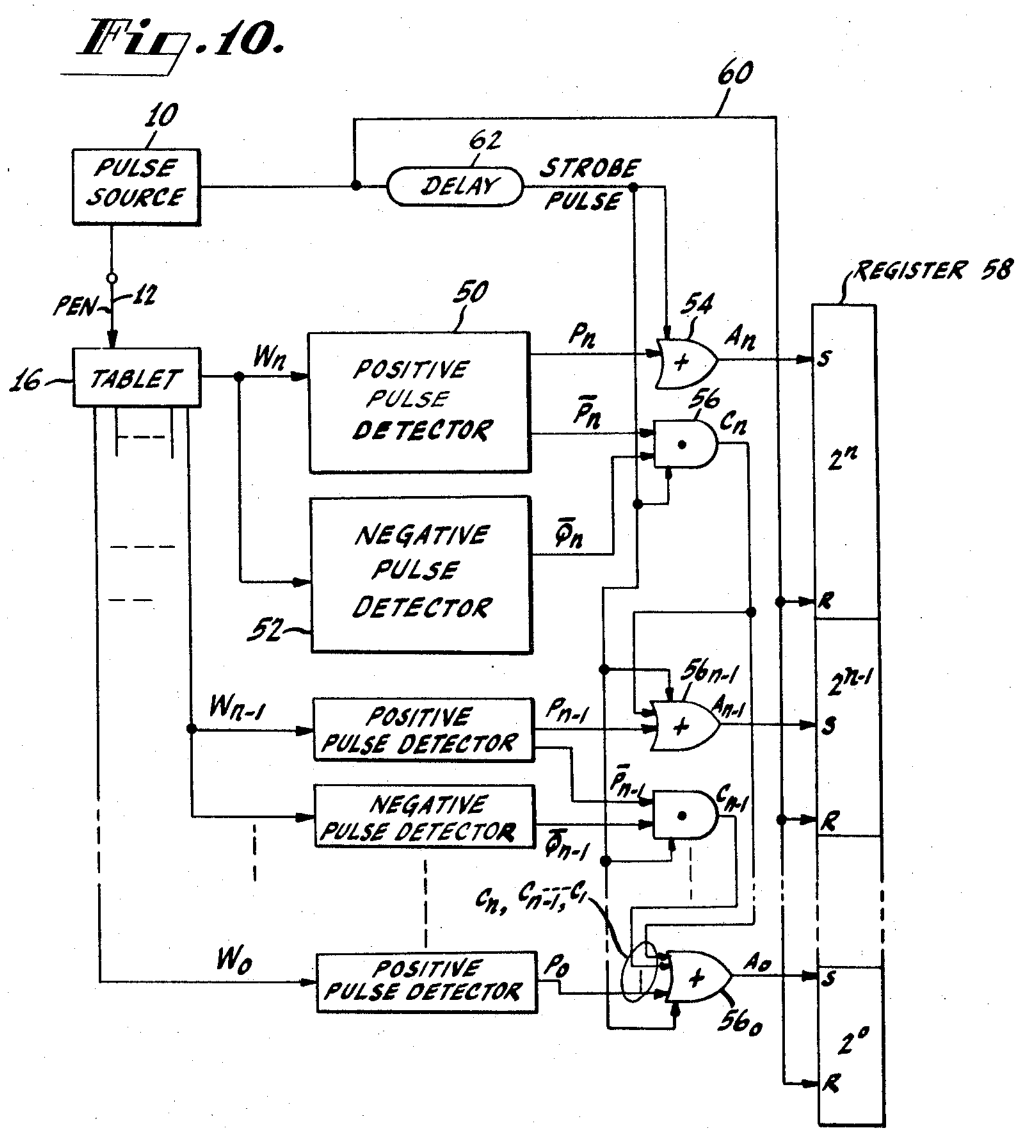
Figure 11:
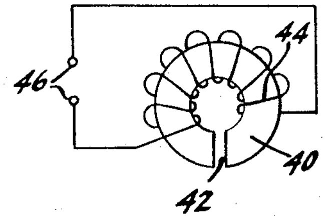
Figure 13:
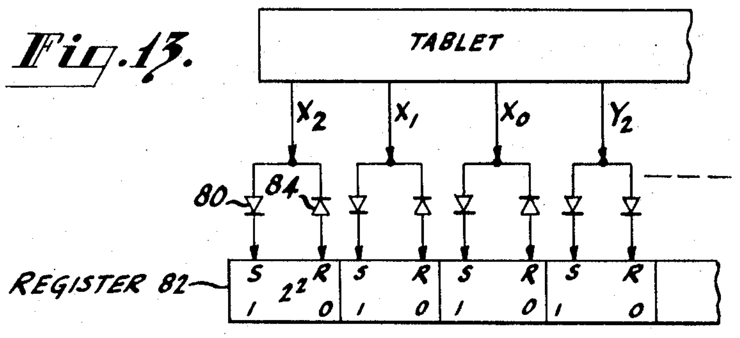
Figure 14:
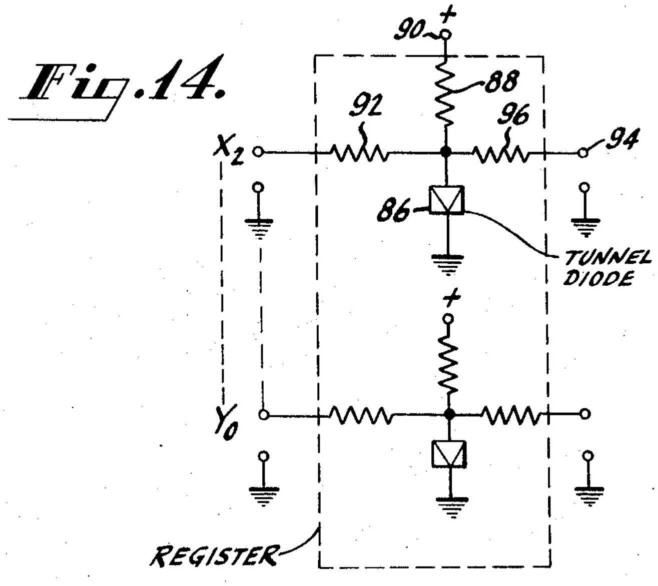
Figure 15:
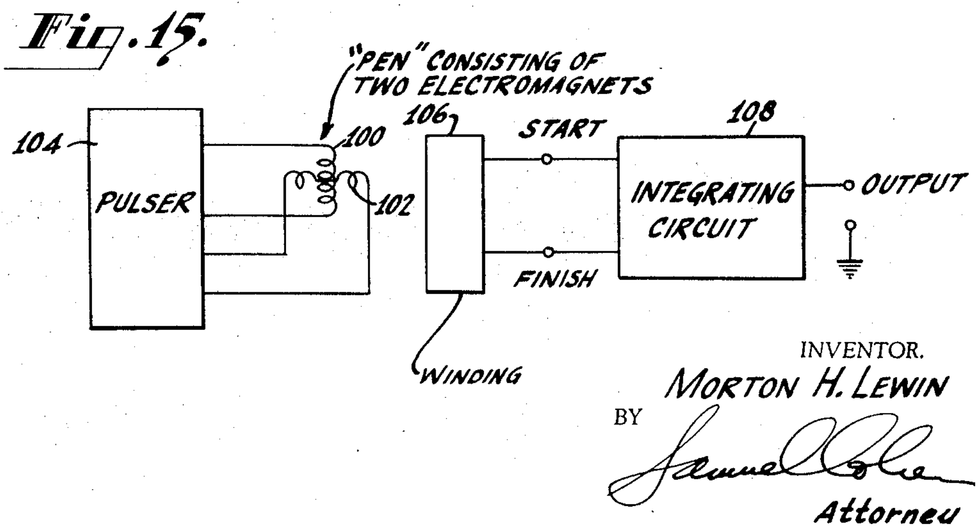

FIGURES 7*a* through 7*h* illustrate schematically the form the windings may take in a tablet which produces two 4-bits output words;

FIGURE 8 is a simplified showing of the pen and one winding, the winding being shown in cross-section;

FIGURE 9 is a drawing of waveforms to help explain the operation of the systems of the present invention;

FIGURE 10 is a block circuit diagram showing, in more detail, the logic stages of the system of FIGURE 1;

FIGURE 11 is a circuit diagram showing, in somewhat more detail, the construction of the tip of the pen;

FIGURES 12*a*, 12*b* and 12*c* illustrate windings in a tablet in which the 1–0 boundary of any winding does not occur directly over the 1–0 boundary of any other tablet;

FIGURE 12*d* is a table showing the binary code which is generated with the windings of FIGURES 12*a* through 12*c*;

FIGURE 13 is a drawing showing the interconnection between a tablet such as shown in part in FIGURES 12*a* through 12*c* and a register;

FIGURE 14 shows a modified form of register which may be used with a tablet illustrated in part in FIGURES 12*a* through 12*c*; and FIGURE 15 schematically shows a modified form of pen and associated circuits which may be used in the present invention.

The system shown in FIGURE 1 includes a pulser 10 which is electrically connected to a pen 12. The pen includes, at its tip, an electromagnet having no remanence. Each time the pulser 10 applies a current pulse to the pen 12, the pen generates a localized magnetic field at its tip 14.

The pen 12 is movable over the surface of a tablet 16. The tablet includes successive winding layers which are discussed in more detail below. Each time a pulse is applied to the pen, the magnetic field produced by the pen induces a voltage in each of the windings making up the tablet. In certain positions of the pen, a winding produces a positive output pulse representing a binary digit of one value, such as a 1, and in other positions of the pen a winding produces a negative voltage pulse representing the binary digit of the other value, such as a 0. Certain of the windings product outputs indicative of the pen position along the X coordinate and the remaining windings produce outputs representative of the pen position along the Y coordinate. These coordinates are illustrated schematically in FIGURE 1 by the appropriately legended arrows.

The outputs produced by the tablet are applied via a cable 18 to logic stages 20. Their purpose is to resolve any ambiguity which may exist in the numbers representing the pen position, as discussed in more detail later. The output binary numbers produced by the logic stages are applied to a storage circuit such as a register or the memory of a computer.

Figure 3:
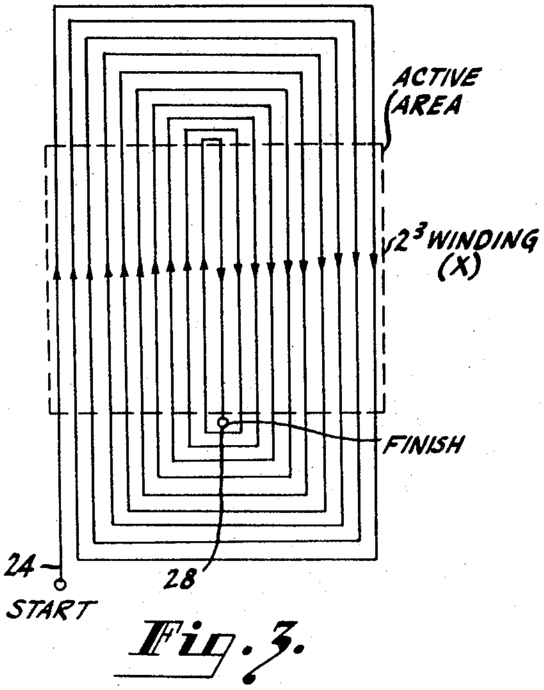
FIGURES 3 and 4 show certain of the windings making up the tablet of the arrangements of FIGURES 1 and 2.

FIGURE 3 illustrates one winding of an eight winding tablet. Such a tablet produces eight outputs representing two 4-bit binary numbers, one number indicative of the X position of the pen and the other of the Y position of the pen. Of course, the tablet may have more or less than eight windings. The single winding of FIGURE 3 produces an output indicative of the most significant bit of the X number. Therefore, this winding is legended the $2^3$ winding. The portion of the winding within the dashed block legended "active area" is the one over which the pen is permitted to move. Note that one-half of the wires in the active area extend in one direction with respect to the start terminal 24 and the other half of the windings extend in the opposite direction.

A simplified cross-sectional showing of the winding of FIGURE 3 appears in FIGURE 8. The pulse source 10 and the electromagnet of the pen 12 are also shown. If the pen is located over any of the windings 26 which extend in one direction, an output voltage in one sense appears across the output terminals 24, 28 of FIGURE 3. On the other hand, if the pen is over any of the windings 30 which extend in the opposite direction, the output voltage pulse produced at the winding is of the opposite sense.

The various waveforms which may exist are shown in FIGURE 9. The current pulse 32 applied to the electromagnet has a steep leading edge and a more gradually sloping trailing edge. The output pulse produced when the pen is over winding section 26 of FIGURE 8 is arbitrarily assumed to be a positive pulse 34. In this case, the pulse produced when the pen is over winding section 30 is a negative pulse 36. The positive pulse arbitrarily may be assumed to represent a 1 and the negative pulse a 0.

Figure 4:
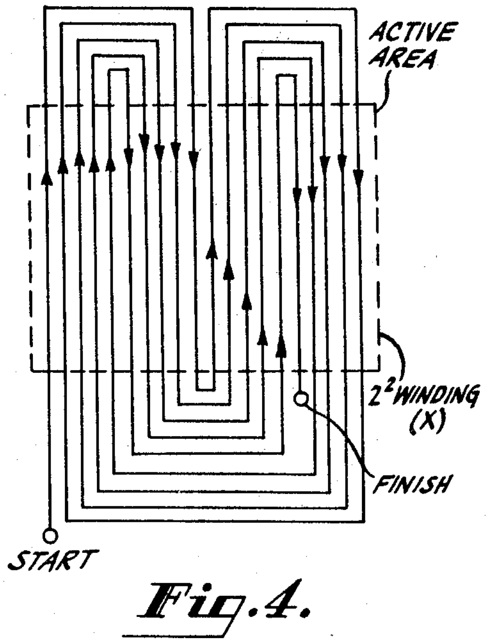

FIGURE 4 illustrates the winding which represents the bit of next significance, namely the $2^2$ bit in this example. As is clear from this figure, the active area includes two alternate sections which represent the bit 1 and two alternate sections which represent the bit 0. In other words, reading from left to right, the first five wires and the eleventh through fifteenth wires extend in one direction and arbitrarily are assumed to represent the bit 1, whereas the sixth through tenth and the sixteenth through the twentieth wires extend in the opposite direction and arbitrarily are assumed to represent the bit 0.

The complete eight layer tablet is illustrated schematically in FIGURES 7*a*–7*h*. The cross-hatched areas represent "1" winding sections and the clear areas represent "0" winding sections. In practice, these windings are stacked one over the other in the realtive positions shown. Each winding is, of course, insulated from the remaining windings, although, as mentioned later, if desired, one terminal, such as the "finish" terminal, of all windings may be connected to a common ground. The position of the pen is illustrated schematically in FIGURES 7*a*–7*h* by the cross within the circle.

When the pulser applies a current pulse to the pen of FIGURE 7, each winding produces an output pulse. If the pen is located over the 1 section of the particular winding that winding produces a positive pulse representing a 1. If the pen is over the 0 section of a winding, that winding produces a negative output pulse representing a 0. In the arrangement shown, the respective X windings produce output pulses, reading from left to right, which are ++ + −, manifesting the binary number 1110. This number is indicative of the position of the pen along the X coordinate. In a similar manner, the respective Y windings produce outputs, reading from left to right, which are ++ − +, manifesting the binary number 1101. This number is indicative of the pen position along the Y coordinate.

Figure 5:
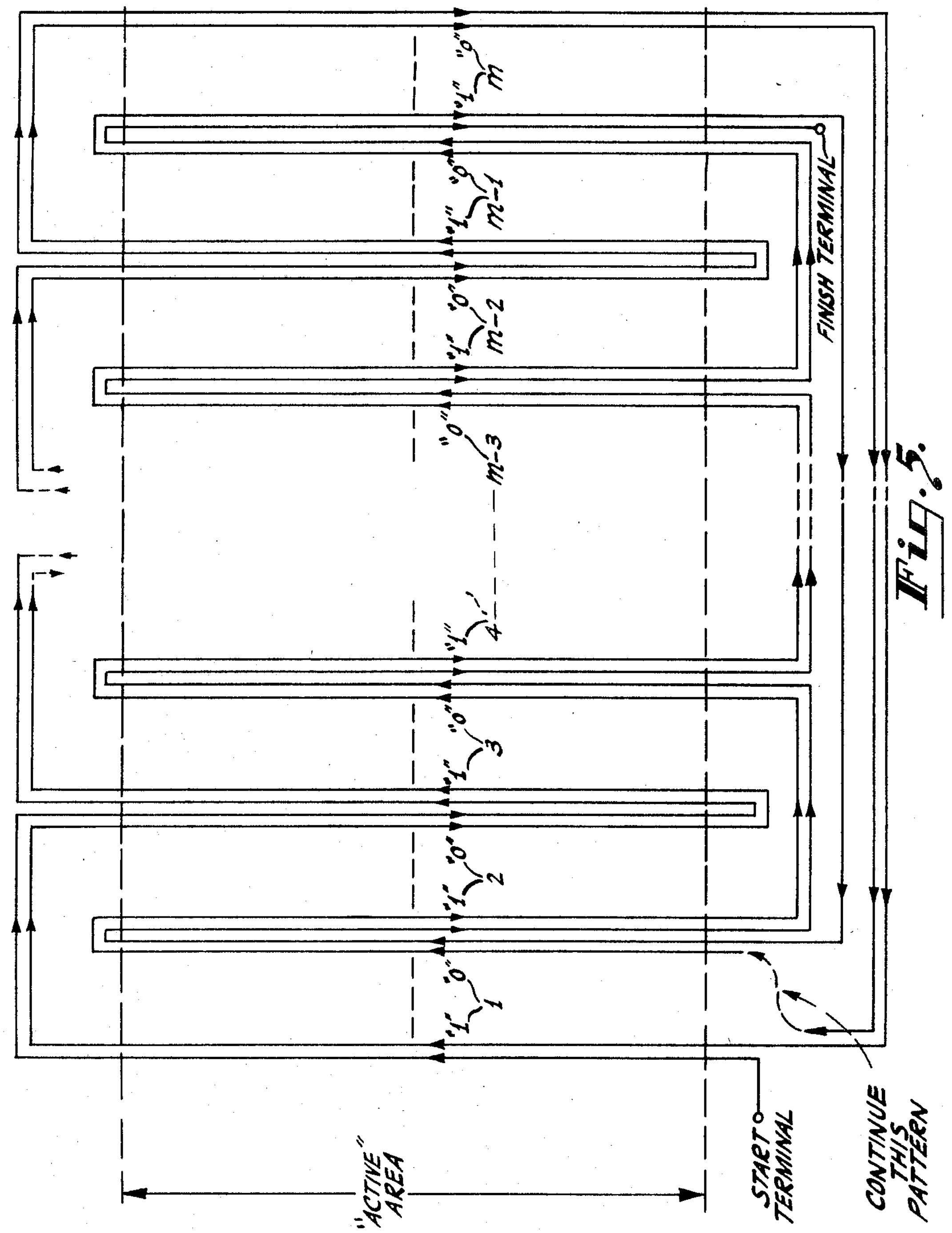
FIGURE 5 illustrates, in more general terms, the way in which any winding of the tablet may be fabricated.

The actual method of winding the various layers has been illustrated specifically for the $2^3$ and $2^2$ windings in FIGURES 3 and 4. FIGURE 5 is a more generalized showing of how any layer may be wound. As should be clear from FIGURE 7, the X windings extend in one direction and the Y windings in another direction. The order in which the various layers occur is unimportant. However, it is necessary to maintain the pen oriented over the tablet so that it induces a voltage both in the X and Y windings. The orientation of the electromagnet, in other words, should be such that the plane in which the magnetic field lies is at approximately 45° both to the X and Y directions.

FIGURE 11 illustrates a preferred type of electromagnet which is suitable for a pen. It consists of a very small core 40 formed with a slot 42 therein. The core is formed of a ferrite material having no appreciable remanence. A winding 44 is located on the core. The terminals 46 of this winding lead to the pulser 10 of FIGURE 1.

For many purposes, the proper 45° pen orientation may be achieved simply by placing a mark on the pen to remind the user to hold the pen in the correct position. However, one can insure that the 45° relationship is maintained by appropriately mounting the pen, as for example, on an XY coordinate frame such as is employed for plotting boards. Even more simply, the pen may be permanently secured at its back end to a relatively long flexible cable of the type which is difficult to twist. Cables of this general type are employed for speedometers or the like. However, even a piano wire will do, as the relationship need not be maintained at precisely 45°.

As a third alternative, electric means may be employed to insure that the generated magnetic field always cuts wires in both X and Y layers. One simplified way this may be done is to use two electromagnets which may, in practice, be slotted cores whose poles are oriented at 90° with respect to one another, as shown schematically at 100, 102 in FIGURE 15. The two electromagnets, in this case, are pulsed at different time intervals by the pulser 104. If the pen is properly oriented, that is, if the plane of each generated field is at exactly 45° to both the X and Y windings, each winding will produce two output pulses of equal amplitude in response to the two current pulses applied to the respective electromagnets 100, 102. On the other hand, if the pen orientation should change slightly from the 45° relationship discussed above, one output pulse of a winding will increase in amplitude slightly and the other decrease slightly.

In the arrangement of FIGURE 15, the pairs of output pulses produced by each winding are combined to produce an output proportional to the sum of each pair of pulses. Therefore, even if the pen orientation should change slightly, the output of each combining circuit will remain at a relatively uniform value. The combining circuits may, for example, be integrating circuits, one such circuit per winding. One such winding 106 and its integrating circuit 108 are shown in FIGURE 15.

In the discussion so far, it has been assumed that the magnetic field produced by the pen causes a winding to generate either a positive pulse or a negative pulse. However, if the pen is at the boundary between a 1 section and a 0 section of a winding, it will induce a positive pulse in the 1 winding section and a negative pulse in the 0 winding section. These two pulses may be sufficiently close in amplitude that they cancel and the winding produces no appreciable output pulse. Moreover, with the winding arrangement illustrated in FIGURE 7, certain of the 1 and 0 boundaries occur directly over one another. This makes it possible for more than one winding to produce no output pulse.

It is desirable, in the arrangement described above, to make some estimate of the actual pen position when it is over a boundary. There are a number of ways this can be done. In the present arrangement, the most significant bit which cannot be resolved is arbitrarily assumed to be a 0 and all bits of lower significance are assumed to be a 1.

Figures 7A, 7B, 7C, 7D:
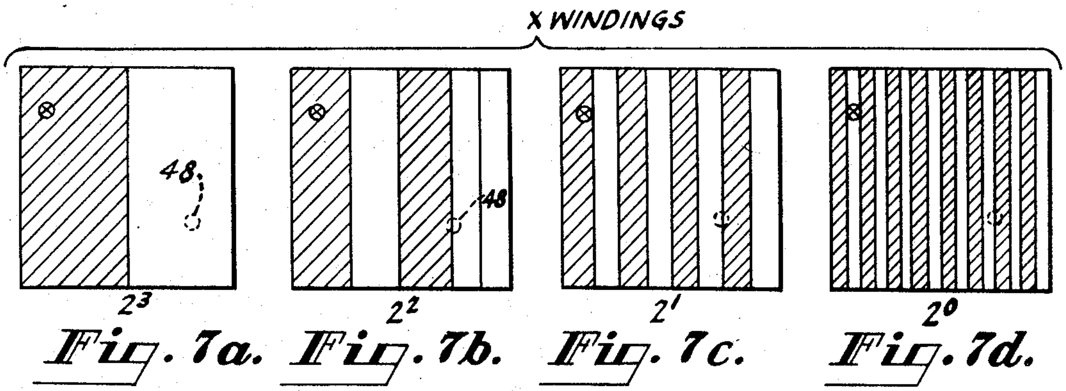
Figures 7E, 7F, 7G, 7H:
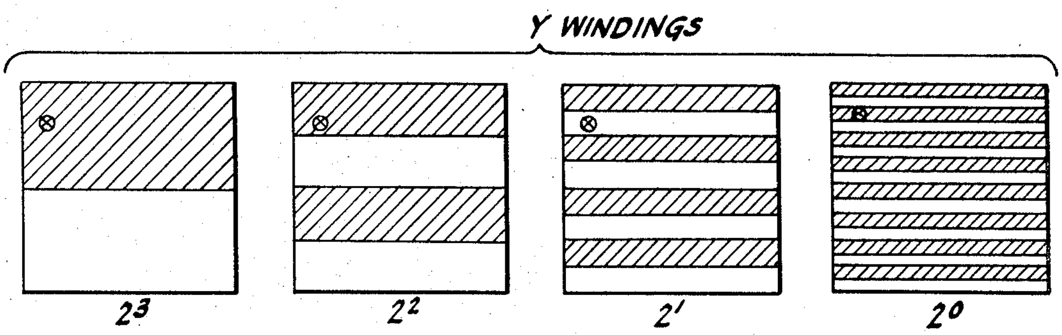

To illustrate the algorithm above, assume that the pen is at position 48 in FIGURES 7*a*–7*d*. Position 48 in FIGURE 7*a* represents a 0. Position 48 in FIGURE 7*b* is ambiguous, that is it can be a 1 or a 0. The same holds true in FIGURES 7*c* and *d*. In this situation, the binary number represented is assumed to be 0011. If the pen were slightly to the right, the ambiguity would be resolved and the binary number would actually be 0011, which is the same as the assumed number. If the pen position were slightly to the left, the ambiguity would be resolved and the actual number would be 0100, which is only one more than the assumed number.

The logic circuits for performing the algorithm discussed above, are shown schematically in FIGURE 10. The pen, source, and tablet are shown at 10, 12 and 16, respectively. The most significant X winding of the tablet produces an output pulse $W_n$ which may be positive or negative. It is applied to circuits 50 and 52, legended "positive pulse detector" and "negative pulse detector," respectively. The positive pulse detector is a monostable circuit and in response to a positive pulse $W_n$ produces an output signal $P_n$ representing a 1 and $\overline{P}_n$ representing a 0. In the absence of an input pulse or in response to a negative input pulse, the outputs of the pulse detector 50 are $\overline{P}_n=0$ and $\overline{P}_n=1$.

The negative pulse detector 52 is a monostable circuit which normally produces an output $\overline{Q}_n=1$. In response to a negative input pulse, circuit 52 produces an output $\overline{Q}_n=0$.

The output $P_n$ of circuit 50 is applied to an OR gate 54. The outputs $\overline{P}_n$ and $\overline{Q}_n$ are applied to an AND gate 56. Both of these gates are normally disabled and both normally produce outputs indicative of the bits 0.

The $A_n$ output of OR gate 54 is applied to the set terminal of the $2^n$ stage of register 58. The output $C_n$ of AND gate 56 is applied to the OR gates for all succeeding X windings.

In the operation of the arrangement of FIGURE 10, register 58 is initially storing some number indicative of say the X position of the pen. Each time the pulse source 10 applies a current pulse to the pen 12, it also applies a reset signal via lead 60 to the reset terminals of register 58 clearing the register. After a short delay inserted by delay line 62, the pulse from source 10 is applied as a priming or strobe signal to the various AND and OR gates. The delay interval is preferably equal to that inserted by stages 50 and 52. If during this strobe interval a winding such as the $X^n$ winding produces a positive output pulse $W_n$, the pulse detector 50 produces an output $\overline{P}_n=1$ and $\overline{P}_n=0$. The $\overline{P}_n=1$ output enables OR gate 54 and it applies a set input $A_n=1$ to the $2^n$ stage of the register 58. The set register represents storage of the bit 1.

Assume now that a layer produces a negative output pulse. If a signal such as $W_n$ is negative, the negative pulse detector 52 produces an output $\overline{Q}_n=0$. This disables AND gate 56. The positive pulse detector 50 produces an output $P^n=0$, therefore, OR gate 54 is disabled. If the gates 54 and 56 are both disabled, $A_n=0$ and $C_n=0$. The register stage $2_n$ has previously been reset and accordingly, it continues to represent storage of the bit 0.

Assume now that an output pulse such as $W_n$ is 0 indicating that pen is over a 1–0 boundary and an ambiguity exists. The positive pulse detector, in this case, continues to produce an output $\overline{P}=1$ and the negative pulse detector continues to produce an output $\overline{Q}_n=1$. $P_n$ continues to remain 0. Therefore, when the strobe pulse occurs, OR gate 54 remains disabled and $A^n=0$. This means that the $2^{nth}$ stage of the register remains reset, representing storage of bit 0. However, $\overline{P}_n$ and $\overline{Q}_n$ are both 1, AND gate 56 becomes enabled and $C_n=1$. $C_n=1$ is applied to all succeeding OR gates. Accordingly, each OR gate of lower significance, such as $56_{n-1}$ and $56_0$ and all OR gates between these two extremes, become enabled and produce an output $A=1$. Each $A=1$ output is a set signal for the register stage to which it is applied and, therefore, each register stage after the $2^n$ stage (in this example) stores a signal representing a 1. Thus, in any case in which a layer produces no output, the register stage associated with that layer stores a 0 and all succeeding register stages, that is register stages of lower significance, store a 1.

FIGURE 10 illustrates the logic stages for, for example, the X windings. The logic stages for the Y windings are identical with the stages shown in FIGURE 10 and are, therefore, not illustrated separately.

The logic circuits of FIGURE 10 are employed only because the 1–0 boundaries in a number of successive windings may occur one exactly over the other. Windings of this type are useful because the outputs they produce are in straight binary code—the code employed by many digital computers. However, one can employ instead of the windings shown in FIGURE 7, windings in which the 1–0 section boundaries never occur one over another. In this case, the assumption arbitararily may be made that no signal from a winding represents, for example, the previous bit which was generated by that winding. (This is discussed in more detail later.) Since only one ambiguity is possible in one set of windings, this assumption is perfectly acceptable and gives a bit position which always is within one bit of the actual bit position.

Figure 2:
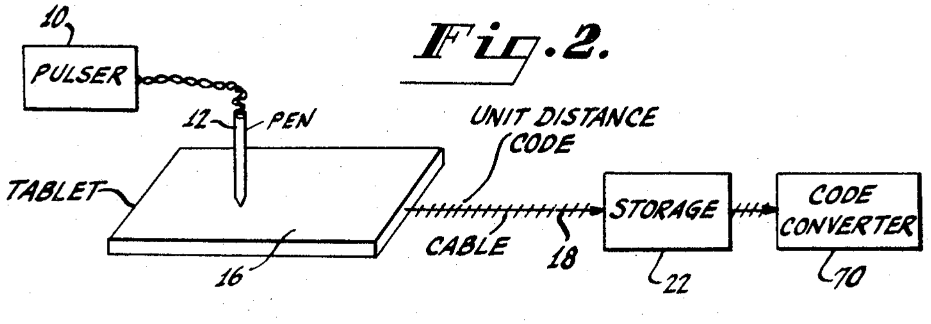
FIGURE 2 is a schematic showing of another form of the present invention.

An arrangement of the above type is illustrated generally in FIGURE 2. The pulser 10 and pen 12 are identical to the corresponding elements of FIGURE 1. The tablet 16 includes layers of the type just described, that is, layers in which a 1–0 boundary, for example, in one X winding, never occurs directly over a 1–0 boundary in any other X winding. It can be shown that the output binary code produced in this case is a unit-distance code. In other words, when the code changes from one value to the immediately succeeding or preceding value, only the value of one bit changes. This unit-distance code may be applied via cable 18 directly to the storage circuits 22. The computer may be adapted to use this code directly. If not, a code converter 70 is employed to translate the unit-distance code to any other form of binary code, as for example, a straight binary code. Code converters of this general type are well known.

Some of the windings making up the tablet of FIGURE 2 are illustrated in FIGURES 12*a*–12*c*. The assumption is made for purposes of this explanation, that the table contains six windings. (Again, in practice, many more than six windings may be employed.) The three X windings are shown in the three figures. The three Y windings are identical but are rotated through ninety degrees.

The 1–0 boundaries occurring in each winding are illustrated in FIGURES 12*a*–12*c* by dot-dash lines. It is clear from the figures that no 1–0 boundary in any layer occurs directly over the 1–0 boundary in another layer.

When the pin is over wire A in each layer, the binary code which is generated by the three layers in response to the local magnetic field produced by the pin is 111. The table of FIGURE 12*d* shows the binary numbers which are generated over the remaining wires.

A more detailed showing of the connection between the tablet and the register, both of the arrangement of FIGURE 2, appears in FIGURE 13. One terminal, such as the finish terminal, of each winding is connected to ground. The other terminal, such as the start terminal, of each winding is connected through one diode to the set terminal of a storage stage and through an oppositely-poled diode to the reset terminal of that storage stage. In FIGURE 13, for example, the lead from the $X_2$ winding, which is so legended, is connected through diode 80 to the set terminal of the $2^2$ stage of register 82 through the oppositely-poled diode 84 to the reset terminal of the $2^2$ stage.

In the operation of the arrangement of FIGURE 13, if a positive pulse appears, for example, on lead $X_2$, it passes through diode 80 and sets the $2^2$ stage of the register. If a negative pulse appears on the $X_2$ lead, it passes through diode 84 to the reset terminal of the $2^2$ stage. A set register stage represents storage of a "1" and a reset register stage represents storage of a "0." If, on the other hand, the pin happens to be over the 1–0 boundary of the $X_2$ winding, no pulse appears on the $X_2$ lead and the $2^2$ register stage continues to store the bit previously stored there.

One advantage of the circuit of FIGURE 13 is that it is very simple. It is not necessary to reset the register each time a new number is stored in the register. (However, as is well understood, there may be a general reset connection between the control area of the computer and the reset terminals of the register.) Also, the coupling circuit between the tablet and the register is quite simple. However, if the digital computer connected to register 82 or of which register 82 is a part is not equipped to handle the unit-distance code stored in the register, a code converter is necessary.

FIGURE 14 shows a register arrangement for the tablet of FIGURE 2 which is even simpler than the arrangement of FIGURE 13. Each stage of the register consists of a tunnel diode 86 which is bistably biased by a current source. The source is represented schematically in FIGURE 14 by the resistor 88 which is connected between the anode of the tunnel diode and a positive voltage source connected to terminal 90. The X lead is connected to the anode of the tunnel diode through resistor 92 and the output terminal at 94 is connected to the anode of the tunnel diode through a resistor 96.

Figure 6:
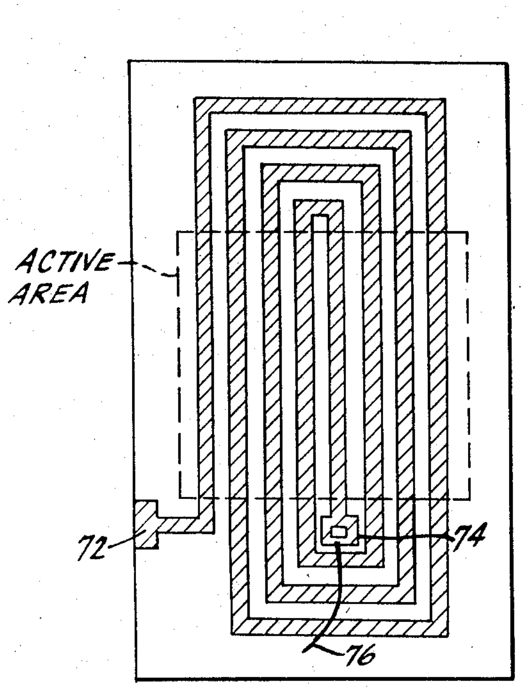
FIGURE 6 illustrates the form which a so-called "printed" winding may take.

In the operation of the arrangement of FIGURE 14, the tunnel diodes may all initially be bistably biased to the low voltage state. This state arbitrarily may be assumed to represent storage of a 0. In response to a positive pulse from a winding, the tunnel diode is switched to its high voltage stable state representing the storage of a 1. If the tunnel diode is in its high voltage state and a negative pulse is received, the diode is switched back to its low voltage state representing storage of the bit 0. The windings making up the various layers in the arrangements of FIGURES 1 and 2 may be formed of insulated wires which pass over suitable terminals. However, in a preferred form of the invention, printed windings, such as shown in FIGURE 6, are used instead. A printed winding may consist of copper on a suitable insulating substrate such as Mylar or the like. The winding may be printed by any appropriate technique as, for example, photo-etching, vapor deposition, printing, silk screening, and so on. One terminal of the printed winding, terminal 72, in many cases, may be arranged at the outside edge of a Mylar sheet in an easily accessable position. The second terminal 74 may be surrounded by printed windings and, therefore, not as easily accessable. One may, however, connect a thin insulated wire to terminal 74 as, for example, by soldering, prior to the time that the successive layers are assembled. Such a wire is illustrated at 76. This wire may pass over the inactive portion of any winding and in this way not interfere with the active area.

An alternative treatment for the internal terminals 74 is to so arrange the printed windings that these terminals are in the same position on each substrate. In this case, the terminals may readily be connected together by placing a hole through each terminal so that when the successive layers are assembled, the holes in each terminal 74 are in alignment.Then solder may be poured into the hole for interconnecting these terminals to a common ground connection. To insure proper contact for the terminals 74, the holes in adjacent terminals may be slightly staggered with respect to one another.

One further advantage of the type of winding shown in FIGURE 6 is its compact structure. It is possible, using the techniques described, to put one winding on one surface of the substrate and a separate winding on the opposite surface of the substrate. One winding, for example, may be an X winding and the other the corresponding Y winding.

What is claimed is:

1. An arrangement for translating a position into a digital quantity in parallel binary form comprising, in combination:

a plurality of coils, lying in respective parallel planes and stacked planar surface to planar surface to form a planar tablet, one group of said coils comprising parallel wires which extend in one direction, and the remaining group of coils comprising parallel wires which extend in a direction at a substantial angle to the wires in said one group, each coil in a group being wound to represent a different power of two in a straight binary code;

means located adjacent to a face of said tablet for generating a pulsed magnetic field and applying it to a restricted region of said tablet for causing output signals which represent binary digits to be produced by the respective coils; and means responsive to the absence of an output signal from an coil of a group of said coils for producing an output representing a binary digit of one valve for that coil, and outputs representing the binary digit of another value for the other coils, if any, in that group which represent bits of lower significance than that coil.

2. In an arrangement including a "pen," the position of which represents an analog quantity and a tablet over the surface of which the pen is movable, the improvement comprising: said pen including means for transmitting a signal to a restricted location on said tablet; said tablet comprising a signal receiver for producing parallel outputs representing, in straight binary form, the position of said pen; and means responsive to an ambiguous indication in said parallel outputs for assigning to the ambiguous indication one binary value and to all indications representing bits of lower significance the other binary value.

3. An arrangement for translating analog positional information to binary information comprising, in combination:

a tablet comprising a plurality of planar pick-up means arranged one over another, each such means corresponding to a different order digit in a binary system of notation, and each such means being coded in accordance with the order digit to which it corresponds, in such manner as to produce an output consisting of one of two possible binary values dependent upon the location at which it receives a stimulus; and means movable adjacent to the surface of the tablet for generating a stimulus and applying that stimulus to a relatively small region in the same relative position on each pick-up means.

4. An arrangement for translating analog positional information to binary information comprising, in combination:

a tablet comprising a plurality of planar pick-up means stacked one over another and arranged in two groups, each such means in a group corresponding to a different order digit in a binary system of notation, each pick-up means in one group being coded in accordance with the order digit to which it corresponds, in such manner as to produce an output consisting of one of two possible binary values dependent upon the location along a first coordinate at which it receives a stimulus, and each pick-up means in the other group being coded in accordance with the order digit to which it corresponds, in such manner as to produce an output consisting of one of two possible binary values dependent upon the location along a second coordinate at which it receives a stimulus; and means movable adjacent to the surface of the tablet for generating a stimulus and applying that stimulus to a restricted location in the same relative position on each pick-up means.

5. An arrangement for translating analog positional information to binary information comprising, in combination:

a tablet comprising a stack of planar pick-up means arranged planar surface to planar surface, each such means corresponding to a different order digit in a binary system of notation, and each being coded in accordance with the order digit to which it corresponds, in such manner as to produce an output consisting of one of two possible binary values dependent upon the location at which it receives a stimulus; and means movable adjacent to the surface of the tablet for generating a stimulus and applying that stimulus to a restricted location in the same relative position on each pick-up means.

6. In an arrangement including a single "pen," the position of which represents an analog quantity and a tablet over the surface of which the pen is movable, the improvement comprising: said pen including means for generating a magnetic field and applying said field to a restricted location on said tablet; and said tablet comprising two groups of coils, each coil in a group wound in accordance with a different order digit in a binary system of notation in such manner as to produce parallel outputs representing, in binary form, the position, in two coordinates, of said pen.

7. An arrangement for translating analog positional information to binary information comprising, in combination:

a tablet comprising a plurality of planar pick-up means stacked one over another planar surface to planar surface, each such means subdivided into binary 1 and binary 0 stimulus responsive signal generating sections and each corresponding to a different order digit in a binary system of notation, each such means being coded in accordance with the order digit to which it corresponds, in such manner as to produce an output consisting of one of two possible binary values dependent upon the location at which it receives a stimulus, and the 1–0 section boundary on each pick-up means being laterally displaced from the 1–0 section boundaries of the remaining pick-up means; and means movable adjacent to the surface of the tablet for generating a stimulus and applying that stimulus to a restricted region in the same relative position on each pick-up means.

8. An arrangement for translating a position into a digital quantity in parallel binary form comprising, in combination:

a plurality of coils, lying in respective parallel planes and stacked planar surface to planar surface to form a planar tablet, one group of said coils comprising parallel wires which extend in one direction, and the remaining groups of coils comprising parallel wires which extend in a direction at a substantial angle to the wires in said one group, each coil in a group having binary 1 and binary 0 signal generating sections and each coil in a group wound in such manner as to produce an output consisting of one of two possible binary values and representing a different order digit in a binary system of notation; and means located adjacent to a face of said tablet for generating and applying a pulsed magnetic field a relatively small area of said tablet, for inducing output signals which represent binary digits in the respective coils.

9. The arrangement of claim 8, in which each coil has a boundary between each of its 1 and 0 sections, and in which in a group of coils, the boundary between a 1 and 0 section of one coil is laterally displaced from the 1 and 0 section boundaries of all other coils of the same group.

10. An arrangement for translating a position into a digital quantity in parallel binary form comprising, in combination:

a plurality of coils, lying in respective parallel planes and stacked planar surface to planar surface to form a planar tablet, one group of said coils comprising parallel wires which extend in one direction, and the remaining group of coils comprising parallel wires which extend in a direction at a substantial angle to the wires in said one group, each coil in a group corresponding to a different power of two in a straight binary code and being wound in accordance with the order digit to which it corresponds in such manner as to produce an output consisting of one of two possible binary values; and means located adjacent to a face of said tablet for generating and applying a pulsed magnetic field to a restricted region of said tablet for causing the respective coils to produce output signals which represent binary digits.

11. An arrangement for translating analog positional information to binary information comprising, in combination:

a tablet comprising a plurality of planar pick-up means, each such means corresponding to a different power of two in a binary system of notation, and each such means being coded in accordance with the order digit to which it corresponds, in such manner as to produce an output consisting of one of two possible binary values dependent upon the location at which it receives a stimulus;

means movable adjacent to the surface of the tablet for generating a stimulus and applying that stimulus to a restricted region in the same relative position on each pick-up means; and means responsive to no output from a pick-up means indicating an ambiguous indication, for producing an output indicative of a bit of given value.

References Cited

UNITED STATES PATENTS

| | | | |
|---|---|---|---|
| 1,311,384 | 7/1919 | Drew | 178—18 |
| 2,686,222 | 8/1954 | Walker et al. | 340—347 |
| 2,872,671 | 2/1959 | Walton | 340—347 |
| 3,070,787 | 12/1962 | Waldron et al. | 340—347 |
| 3,151,239 | 9/1964 | LeCroart et al. | 178—18 |
| 3,399,401 | 8/1968 | Ellis et al. | 340—324 |

OTHER REFERENCES

Ahmad, "Signal Communication Apparatus," IBM Technical Disclosure, vol. 3, No. 6, November 1960.

Leary, "Binary Character Entry Switch," IBM Technical Disclosure, vol. 4, No. 4, September 1961.

MAYNARD R. WILBUR, Primary Examiner

G. R. EDWARDS, Assistant Examiner

U.S. Cl. X.R.

33—1